UNITED STATES PATENT OFFICE.

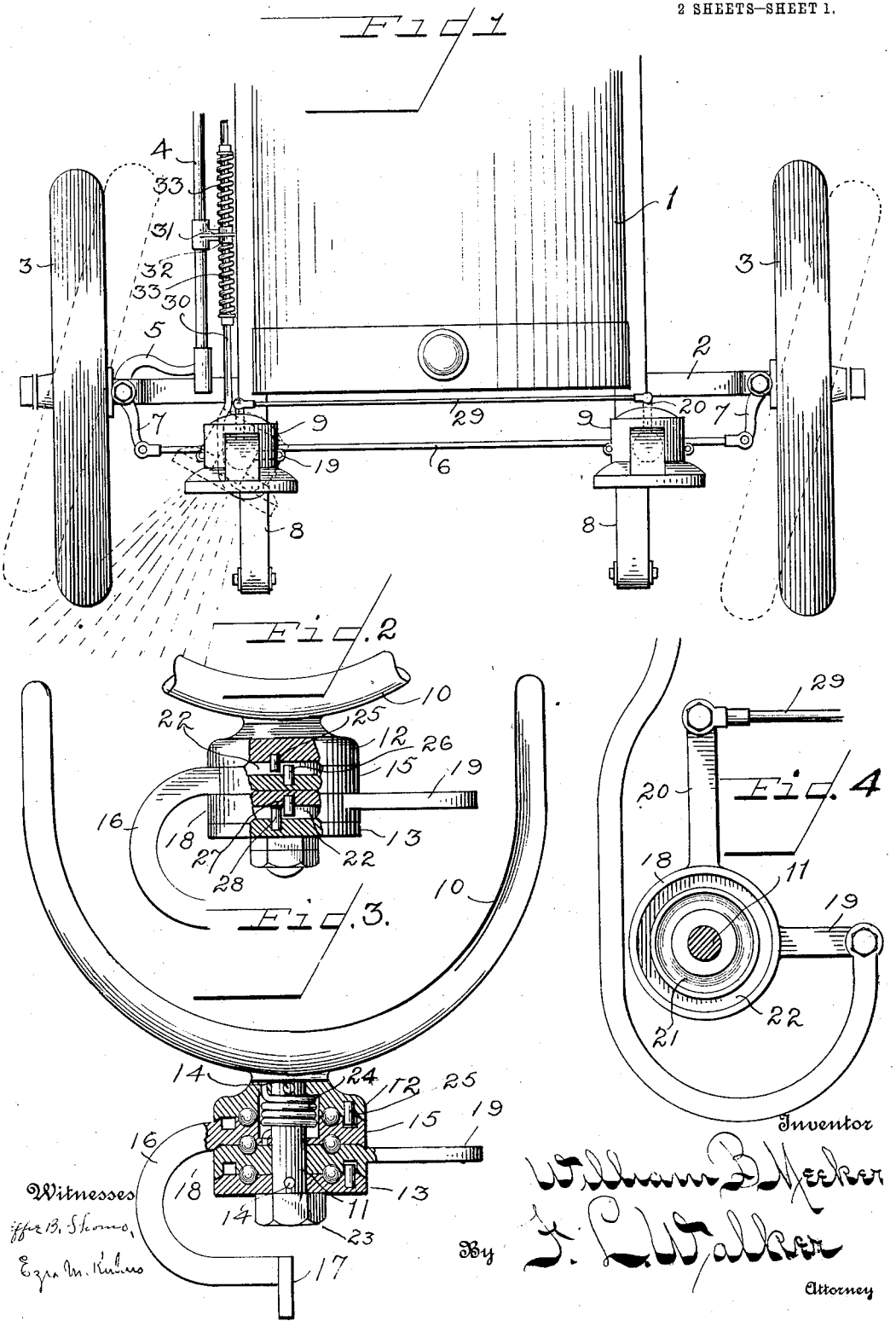

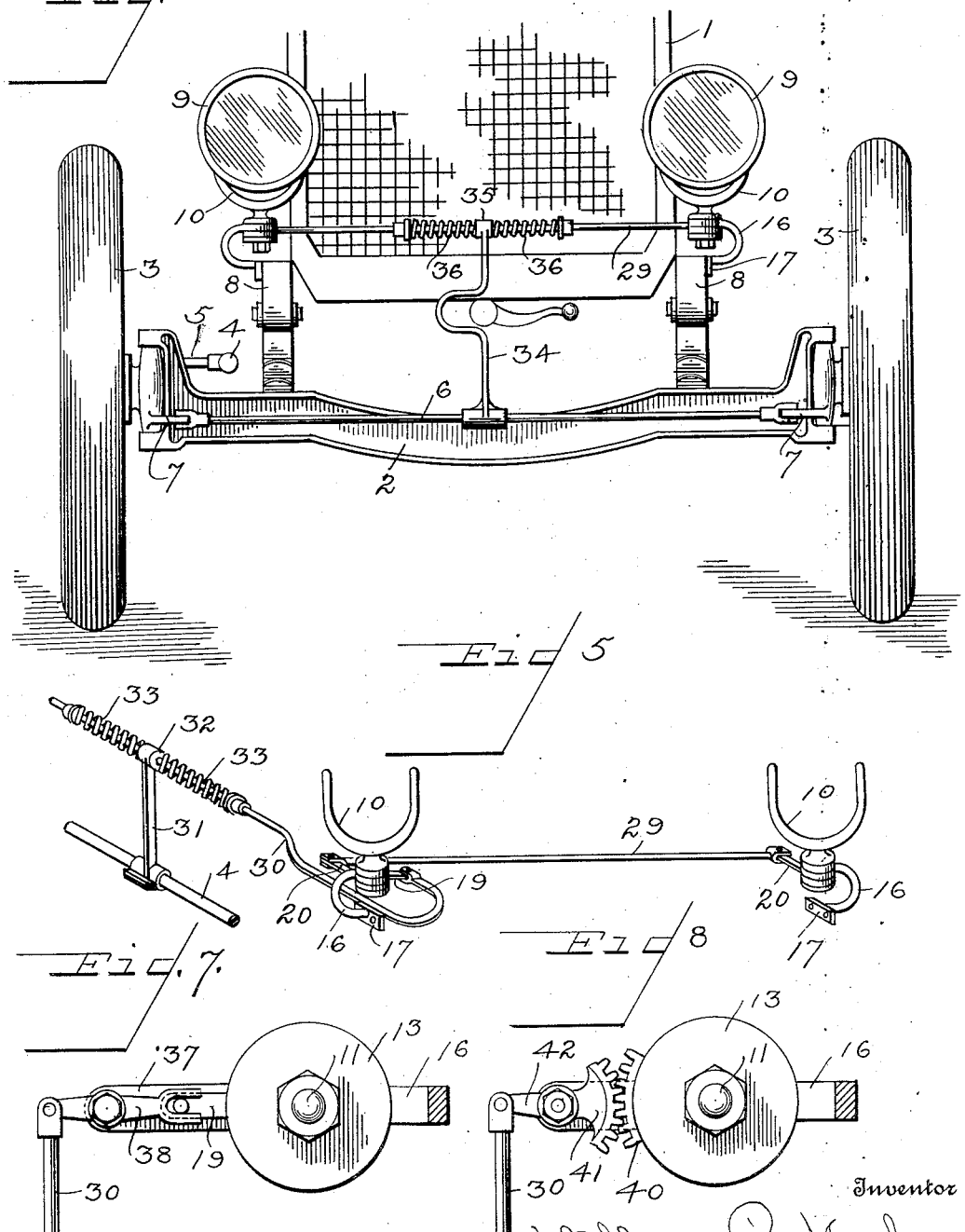

WILLIAM B. MEEKER, OF DAYTON, OHIO, ASSIGNOR TO THE AUTOMATIC LAMP CONTROL COMPANY, OF DAYTON, OHIO, A CORPORATION OF OHIO.

AUTOMATIC LAMP-CONTROLLER.

1,082,545.  Specification of Letters Patent.  Patented Dec. 30, 1913.

Application filed August 12, 1912. Serial No. 714,675.

*To all whom it may concern:*

Be it known that I, WILLIAM B. MEEKER, a citizen of the United States, residing at Dayton, in the county of Montgomery and State of Ohio, have invented certain new and useful Improvements in Automatic Lamp-Controllers, of which the following is a specification.

My invention relates to vehicle lamps and particularly to means for automatically controlling the movement of vehicle lamps whereby the shaft of light cast by such lamps will be immediately varied with each deviation of the vehicle from a straight path.

The object of the invention is to simplify the structure as well as the means and mode of operation of such control mechanism whereby it will not only be cheapened in construction but will be more efficient in use, positive and automatic in its action and unlikely to get out of repair.

With the above primary and other incidental objects in view as will more fully appear in the specification the invention consists of the features of construction, the parts and combinations thereof, and the mode of operation or their equivalents as hereinafter described and set forth in the claims.

Referring to the drawings, Figure 1 is a plan view of the forward portion of an automobile to which the lamp controlling mechanism forming the subject matter hereof has been applied. Fig. 2 is a front elevation partly broken away of one of the lamp supports. Fig. 3 is a transverse sectional view of one of the lamp supports. Fig. 4 is a detail plan view of a portion of one of the lamp supports, showing the operating connections. Fig. 5 is a perspective view of the lamp control mechanism removed from the vehicle. Fig. 6 is a front elevation of an automobile showing the application of a modified form of the lamp control mechanism. Figs. 7 and 8 are detail views of modifications of the operating connections.

Like parts are indicated by similar characters of reference throughout the several views.

Referring to the drawings, 1 is a forward portion or hood of the automobile of which 2 is the front axle to which are connected the swiveled front wheels 3. The wheels are turned upon their swiveled connections by the reciprocatory movement of the steering bar 4 operated from the steering wheel which is not shown. The steering bar 4 is connected to the steering arm 5 carried by the swiveled wheel trunnion. The wheels are caused to move in unison by a connecting rod 6 engaging arms 7 projecting from the swiveled trunnions of the opposite wheels. As thus far described this is the usual automobile construction and forms no part of the present invention. While the invention is herein shown as applied to an automobile it is to be understood that it is not limited to such use but may be applied to other vehicles such as horse drawn cars or wagons or to electric traction cars and other moving vehicles.

Mounted upon the forward extension of the frame bars 8 in the usual position are the lamps 9. These lamps may be carried in any suitable or desired manner. In the drawings the lamps are shown carried in the usual fork. Referring particularly to Figs. 2 and 3 the lamp support comprises a plurality of superposed disks concentrically mounted upon the shaft 11 of the fork 10. The uppermost and lowermost disks 12 and 13 are rigidly secured to the shaft 11 preferably by pinning as shown at 14 or by means of keys or set screws. The shaft is further secured against longitudinal movement by lock nuts 23. The disks 12 and 13 therefore move in unison with the lamp support. The disk 15 is stationary and is provided with a lateral extension 16 having a head 17 adapted to be attached to the frame bar extension and forms a supporting bracket for the structure. The remaining disk 18 is revolubly mounted upon the shaft 11 and rotates under certain conditions independent of both the disk 15 and disks 12 and 13. This disk 18 is provided with two laterally extending operating levers 19 and 20. (See Fig. 4.)

In order that the lamps may operate easily and their revoluble movements be accomplished with minimum friction the several disks are provided with annular ball races in which are located a plurality of bearing balls 21. Surrounding the lamp support shaft 11 is a helical torsional spring 24 having its one end engaged with the disk 12 which as before said is secured upon the shaft 11 and its opposite end secured to the stationary disk 15. This spring 24 is at all times under tension and tends to turn the lamp support and the lamp carried thereby inward, thereby serving to return the lamp to its normal position with its shaft of light directed straight forward after the lamp has been rotated in an outward direction. In addition to the ball races, there are provided in two of the disks, preferably though not necessarily, in the upper side of the disk 15 and the lower side of the disk 18, annular grooves 22. The disk 12 carried by the shaft 11 carries in turn a stud or pin 25 which projects within the groove 22 of the disk 15 and travels therein when the lamp and its support are rotated in an outward direction against the tension of the spring 24. The return movement of the lamp and its support under the influence of the spring 24 will be limited by the engagement of the pin 25 with a stationary stud or pin 26 carried by the disk 15 and projecting within the groove 22 and into the path of the pin 25. The stud or pin 26 is so located that the lamp and its support are arrested in their return movement in such position that the shaft of light from the lamp will be directed straight forward in the path of travel of the machine. The lamp is oscillated against the tension of the spring 24 by the oscillatory movement of the disk 18. This disk 18 as aforesaid is loosely journaled upon the shaft 11. The disk 18 carries a stud or pin 27 which projects into the annular groove 22 of the disk. The lowermost disk 13 carries a stud or pin 28 which also projects into the annular groove 22 and into the path of the pin 27 carried by the movable disk 18. As the movable disk 18 is rotated in one direction by means of the operating lever 19 the pin 27 carried by said disk 18 engages the pin 28 carried by the disk 13 and causes the disk 13 to rotate in unison with the disk 18. The disk 13 being rigidly secured upon the shaft 11 and the disk 12 being likewise secured to said shaft 11 this revoluble movement due to the oscillatory movement of the disk 18 will rotate the lamp support and the lamp against the tension of the spring 24 to direct the shaft of light laterally. Upon the return movement of the parts, the spring 24 will return the lamp and its support to its normal position as before stated, or until the pin 25 carried by the disk 12 engages the stop pin 26 carried by the disk 15. The actuating disk 18 will thereupon be free to continue its revoluble return movement independent of the shaft 11 or the disk carried thereby.

In applying the lamps to vehicles as before stated the lamps are arranged in pairs, one at each side of the machine. The arm 19 may be eliminated from one of the lamp supports. The operating arms 20 of the lamp and its supports are connected by a transverse connecting rod 29. In assembling the lamp supports they are arranged right and left, that is, the engaging pins 25 and 26, and 27 and 28 are reversed in their relation. The construction is such that when the oscillatory actuating disks 18 which are connected one with the other by the connecting rod 29 are oscillated from normal position in one direction the engaging studs 27 and 28 of one support will cause one of the lamps to be oscillated while the other lamp will remain stationary its disk 18 moving idly. Upon a reverse movement of the disks from normal position the other lamp will be oscillated while the first lamp will remain stationary.

To operate the lamps there is provided an operating bar 30 connected with the steering bar 4. Inasmuch as it is desired that the lamps shall be turned in advance of the wheels or at a more rapid rate than the wheels are turned thereby throwing the shaft of light into the space to which the machine is being guided the operating arm 19 of the actuating disk 18 is of less length than the steering arm 5 of the vehicle steering mechanism. Thus a limited reciprocatory movement of the steering bar 4 will serve to oscillate the arm 19 and the actuating disk 18 throughout a degree of movement greater that the steering arm 5. There is provided on the steering bar 4 an arm 31 having a head 32 slidingly mounted on the shaft of the actuating bar 30. Located on opposite sides of the head 32 about the shaft of the actuating bar 30 are helical springs 33 secured at one end to the head 32 and at their opposite ends to the bar 30. These springs 33 are of greater tension than the spring 24 of the lamp support. Therefore the initial reciprocatory movement of the steering bar 4 will not compress the springs 33 but will reciprocate the actuating bar 30 which is pivoted to the operating arm 19 of the disk 18 and will serve to oscillate the support against the tension of the spring 24 until said lamp support reaches the limit of its movement. The subsequent movement of the steering bar will be compensated for by the compression of the spring 33. Likewise as the vehicle returns to straight path the springs 33 will take up the initial relative movement of the steering bar 4 and the lamp control mechanism, the actuating bar 30 will be reciprocated by the final movement of the steering bar to return the lamp to normal forward position when the lateral light is no longer needed. In Fig. 6 there is shown a modification in which the actuating connection is made between the connecting rod 29 of the lamp support and the connecting rod 6 of the steering knuckles or swiveled trunnions of the wheels. In this construction an arm 34 is rigidly secured upon the connecting rod 6 and carries at its upper extremity a head 35 slidingly mounted upon the connecting rod 29. Springs 36 are located upon the rod 29 at opposite sides of the head 35 and correspond to the springs 33 before referred to. By this construction the reciprocatory movement of the connecting rod 6 as the wheels are turned from side to side will be transmitted to the connecting rod 29 which will in turn operate the desired lamp.

In Fig. 7 the stationary disk 15 is shown as provided with an arm or bracket 37 to which is pivoted a lever 38 engaging at one end the reciprocatory actuating bar 30 and at its opposite end an operating arm 19 of the primary construction.

Fig. 8 shows a modification in which the oscillatory actuating disk 18 is provided with a series of gear teeth 40 engaged by an intermeshing gear sector 41 from which projects an arm 42 pivotally connected with a reciprocating actuating bar 30.

It will be seen from the construction thus described that so long as the vehicle is traveling in a straight path the adjustable lamps will be maintained in position to direct their shafts of light straight ahead in the path of travel. However, should the vehicle be turned toward the right, the right hand lamp will be oscillated in unison with the turning of the wheels but to a greater degree than the forward wheels are turned, thereby directing the right hand light toward the locality to which the vehicle is being turned. When turning toward the right, the right lamp is turned as before mentioned, but the left hand lamp is maintained in a straight forward direction in alinement with the body of the vehicle. Upon turning to the left, the left hand lamp will be turned in unison with but in advance of the wheels while the right hand lamp will be maintained in alinement with the body.

From the above description it will be apparent that there is thus produced a device of the character described, possessing the particular features of advantage before enumerated as desirable, but which obviously is susceptible of modification in its form, proportion, detail construction and arrangement of parts, without departing from the principle involved or sacrificing any of its advantages.

While in order to comply with the statute, the invention has been herein described in language more or less specific as to certain structural features, it is to be understood that the invention is not limited to any specific details, but that the means and mechanism herein shown and described comprise but one mode of putting the invention into effect and the invention is therefore claimed broadly in any of its possible forms or modifications within the scope of the appended claims.

Having thus described my invention, I claim;

1. The combination with a vehicle of a lamp, an oscillatory shaft upon which the lamp is carried, two concentric superposed disks through which the shaft extends which are relatively rotatable in parallel planes, one of the disks being stationarily secured and forming a journal bearing for the oscillatory shaft, the second disk being secured to the shaft above the stationary disk, upon which it rests to afford a wide thrust bearing for the shaft, a spring operatively connected at one end with the stationary disk and at its opposite end with the shaft, against the tension of which the shaft is rotatable said spring being adapted to return the rotated member to normal when rotated therefrom and means to rotate the shaft against the tension of the spring when the vehicle is turned in one direction from a straight path, but permitting the vehicle to turn the opposite direction without rotating the said shaft.

2. The combination with a vehicle of a lamp, an oscillatory shaft upon which the lamp is carried, two concentric superposed disks through which the shaft extends which are relatively rotatable in parallel planes, one of the disks being stationarily secured and forming a journal bearing for the oscillatory shaft, the second disk being secured to the shaft, a helical spring surrounding the shaft, having one end secured to the stationary disk and its opposite end secured to the disk carried by the shaft, and means to oscillate the shaft against the tension of the spring in unison with deviations of the vehicle from a straight path, substantially as specified.

3. The combination with a vehicle of a lamp, an oscillatory shaft upon which the lamp is carried, two concentric superposed disks through which the shaft extends which are relatively rotatable in parallel planes, one of the disks being stationarily secured and forming a journal bearing for the oscillatory shaft, the second disk being secured to the shaft, one of said disks having a concentric groove therein, a stud carried by the other disk and projecting within the concentric groove and a stop carried by the grooved disk extending within the groove and adapted to engage the stud of the opposite disk to limit the relative rotation of the disks in one direction, and means to oscillate the shaft in unison with deviations of the vehicle from a straight path, substantially as specified.

4. The combination with a vehicle of a lamp, an oscillatory shaft upon which the lamp is carried, two concentric superposed disks through which the shaft extends, one of said disks being stationarily secured and forming a journal bearing for the shaft, the other disk being secured to the shaft above the stationary disk and resting thereon to form a thrust bearing for the shaft, said disks having registering recesses in their adjacent faces, a helical spring located in the chamber formed by such registering recesses having one end engaged with the stationary disk and its opposite end engaged with the disk carried by the shaft, interengaging stops carried by the disks adapted to limit the relative rotation of the disks under the influence of the spring, and means to oscillate the shaft against the tension of the spring in unison with certain variations of the vehicle from a straight path, substantially as specified.

5. The combination with a vehicle of a lamp, an oscillatory shaft upon which the lamp is carried, a bearing for said shaft, two superposed disks carried by the shaft, one of said disks being secured to the shaft and rotating therewith, the other disk being journaled on the shaft and capable of oscillatory movement, independent of the shaft and first mentioned disk and interengaging stops between the disks whereby, when the free disk is oscillated in one direction it will turn the second disk and shaft therewith, but when oscillated in the opposite direction will move independent of the other disk and shaft, substantially as specified.

6. The combination with a vehicle of a lamp, an oscillatory shaft upon which the lamp is carried, a bearing for said shaft, two superposed disks carried by the shaft, one of said disks being secured to the shaft and rotating therewith, the other disk being journaled on the shaft and capable of oscillatory movement independent of the shaft and first mentioned disk, a concentric groove in the face of one of the disks, a stud in the other disk projecting within the groove, and a stop carried by the grooved disk also projecting within the groove and adapted to engage with the stud when the oscillatory disk is moved in one direction to move the second disk and shaft in unison therewith, substantially as specified.

7. The combination with a vehicle, of a pivotally supported lamp, a retracting spring against the tension of which said lamp is revoluble, an actuating connection for controlling the revoluble movement of the lamp by the deviation of the vehicle from a straight path, including a movable arm, two compensating springs of greater strength than the retracting spring of the lamp, one of said springs being located on each side of the movable arm, the adjacent ends of both springs being connected with the arm and the opposite ends connected to suitable supports whereby the movement of the arm in either direction will compress one of said springs and extend the other to oscillate the lamp against the tension of its retracting spring, any further deviation of the vehicle being compensated for by the resiliency of the compensating springs.

8. The combination of the vehicle of a pivotally supported lamp, a retracting spring against the tension of which said lamp is revoluble, a reciprocating steering bar forming a part of the vehicle steering mechanism, a movable actuating member adapted to rotate the lamp against the tension of its retracting spring, two compensating springs located on opposite sides of the actuating member and having their adjacent ends connected thereto and their opposite ends connected with the steering bar, whereby the relative movement of the steering bar and actuating member in either direction will be resisted by both springs.

9. The combination of a lamp, a vertically disposed oscillatory shaft upon which the lamp is carried, a stationary bearing disk in which the shaft is journaled, a spring engaging the disk at one end and operatively connected with the shaft at its opposite end, adapted to return the lamp to normal position when oscillated therefrom, a stop movable in unison with the shaft and a corresponding stop located on the stationary disk in the path of the first mentioned stop adapted to limit the movement of the lamp and shaft under the influence of the spring, an operating member, a stop carried by said operating member, a corresponding stop carried by the shaft adapted to be engaged by the operating member stop, when the operating member is oscillated in one direction, to cause the lamp and shaft to move in unison therewith against the tension of the retracting spring.

In testimony whereof, I have hereunto set my hand this 2nd day of August 1912.

WILLIAM B. MEEKER.

Witnesses:
 EFFIE B. LUTTRINGER,
 EZRA M. KUHNS.